United States Patent
Honkasalo et al.

(12) 
(10) Patent No.: US 6,567,389 B1
(45) Date of Patent: May 20, 2003

(54) METHOD AND ARRANGEMENT FOR HIGH-SPEED DATA TRANSMISSION IN A MOBILE TELECOMMUNICATIONS SYSTEM

(75) Inventors: Zhi-Chun Honkasalo, Bedford, TX (US); Harri Honkasalo, Bedford, TX (US); Harri Jokinen, Hiisi (FI); Harri Posti, Oulu (FI); David Lin, Frisco, TX (US)

(73) Assignee: Nokia Telecommunications Oy, Espoo (FI)

( * ) Notice: Subject to any disclaimer, the term of this patent is extended or adjusted under 35 U.S.C. 154(b) by 1028 days.

(21) Appl. No.: 08/675,893

(22) Filed: Jul. 5, 1996

Related U.S. Application Data

(63) Continuation-in-part of application No. PCT/FI95/00248, filed on May 10, 1995.

(51) Int. Cl.[7] .................................................. H04Q 7/22
(52) U.S. Cl. ...................................... 370/342; 370/468
(58) Field of Search ................................ 370/329, 342, 370/465, 468

(56) References Cited

U.S. PATENT DOCUMENTS

| | | | |
|---|---|---|---|
| 4,805,167 A | 2/1989 | Leslie et al. | 370/84 |
| 4,905,226 A | 2/1990 | Kobayashi | 370/66 |
| 5,235,614 A * | 8/1993 | Bruckert et al. | 375/200 |
| 5,446,739 A | 8/1995 | Nakano | |
| 5,570,369 A | 10/1996 | Jokinen | |
| 5,583,851 A * | 12/1996 | Kato et al. | 370/342 |

FOREIGN PATENT DOCUMENTS

| | | | |
|---|---|---|---|
| EP | 0 516 373 | 2/1992 | H04J/3/16 |
| EP | 0 671 824 A1 | 9/1995 | |
| WO | WO 91/14319 | 9/1991 | H04J/3/16 |

OTHER PUBLICATIONS

"An Overview of the Application of Code Division Multiple Access (CDMA) To Digital Cellular Systems and Personal Cellular Networks", May 21, 1992, Qualcomm.

* cited by examiner

Primary Examiner—Melvin Marcelo
(74) Attorney, Agent, or Firm—Pillsbury Winthrop LLP

(57) ABSTRACT

For improving data transmission over the radio path between a mobile station and a base station in a mobile telecommunications system, a divider splits a data signal whose speed is higher than the maximum data transfer rate in one frame, into at least two signals of lower speed before transmission over the radio path. The mobile station is allocated at least two traffic channels for the high-speed data transmission so that each of the signals of lower speed is transmitted over the radio path in its respective traffic channel. A combiner combines the signals of lower speed received over the radio path, to reconstitute the original signal at the receiving end.

24 Claims, 8 Drawing Sheets

METHOD AND ARRANGEMENT FOR HIGH-SPEED DATA TRANSMISSION IN A MOBILE TELECOMMUNICATIONS SYSTEM

RELATED APPLICATIONS

This is a continuation-in-part (CIP) of International PCT Application PCT/FI95/00248, filed on May 10, 1995.

FIELD OF THE INVENTION

The present invention relates to a method for improving data transmission in a mobile telecommunications system.

BACKGROUND OF THE INVENTION

There are several multiple access modulation techniques for facilitating communications in which a large number of mobile users are present. These techniques include time division multiple access (TDMA), code division multiple access (CDMA) and frequency division multiple access (FDMA).

In TDMA radio telecommunication systems, time division communication in the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out. The Pan-European mobile system GSM (Global System for Mobile Communications) is an example of a TDMA radio system.

CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so called spreading codes, are used to distinguish between different CDMA signals, i.e traffic channels on the wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match, are not despread in bandwidth and as a result, contribute only to the noise and represent a self-interference generated by the system. The spreading codes of the system are preferably selected in such a way that the codes used in each system cell are mutually orthogonal, i.e. they do not correlate with each other. Thus, in the CDMA systems, the spreading code unique to each user or user' signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communications systems, the maximum data rate at the radio interface is relatively low.

For communication in conventional mobile systems, each mobile station is assigned one traffic channel for data or speech transmission. Thus, a GSM system, for example, can have as many as eight simultaneous connections to different mobile stations on a same carrier frequency. The maximum data transfer rate on a traffic channel is restricted to a relatively low level according to the bandwidth in use as well as channel coding and error correction, for example in a GSM system to 9.6 kbit/s or 12 kbit/s. In addition, in a GSM system a half-speed traffic channel (max. 4.8 kbit/s) can be chosen for low speeds of speech coding. The half-speed traffic channel is established when a mobile station communicates in a specific time slot only in every second frame, in other words, in half-speed. A second mobile station communicates in every second frame in the same time slot. This is how the capacity of the system can be doubled as far as the number of subscribers is concerned. In other words, on the same carrier wave it is possible for up to 16 mobile stations to communicate simultaneously.

In the last few years, the need for high-speed data services in mobile communication networks has remarkably increased. Data transfer rates of at least 64 kbit/s would be needed to utilize, for example, ISDN (Integrated Services Digital Network) circuit switched digital data services. PSTN data services of the public telephone network, such as modems and telefax terminals of class G3, require faster transfer rates, such as 14.4 kbit/s. One of the growing areas of mobile data transfer requiring higher transfer rates is the mobile video service. As examples of this kind of services, security control by cameras and video databases can be mentioned. The minimum data transfer rate in video transfer can be, for example, 16 or 32 kbit/s.

The data transfer rates of the present mobile communication networks are not, however, sufficient to satisfy this kind of new needs.

SUMMARY OF THE INVENTION

It is an object of the present invention to enable higher data transfer rates in mobile communication networks.

The object is achieved in a method for high-speed data transmission over a air interface between a mobile station and a fixed mobile communication network in a digital mobile communication system, this method comprising the steps of:

splitting a high-speed data signal into two or more signals of lower speed prior to a transmission over the radio path, allocating, for high-speed data transmission, a mobile station at least two traffic channels, the number of the allocated traffic channels corresponding to the number of the signals of lower speed, and transmitting each data signal of lower speed in different one of said allocated traffic channels.

The invention further relates to an arrangement for for high-speed data transmission in a mobile telecommunications system over the radio path between a mobile station and a base station this arrangement comprising:

means for splitting a high-speed data signal, whose speed is higher than the maximum data transfer rate of one traffic channel, into two or more signals of lower speed prior to transmission over the radio path, a mobile station being allocated two or more traffic channels for high-speed data transmission so that each of the lower-speed signals is transmitted over the radio path in its respective traffic channel, and means for combining the lower-speed signals received over the radio path.

The invention employs a so-called multi-channel technique so that a mobile station has access to two or more traffic channels for one data call. The high-speed data signal to be transmitted over the radio path is split into a required number of data signals of lower speed, each signal being transmitted through respective one of the allocated traffic channels. As soon as the data signals of lower speed have separately been transmitted over the radio path, they are again at the receiving end combined into the original high-speed signal. This is how the data transfer rate can be doubled, tripled, etc., depending on whether two, three or more traffic channels are assigned to be used by a subscriber. In a GSM system, for example, two traffic channels (time slots) will enable a data transfer speed of 2×9.6 kbit/s which is enough for a modem of 14.4 kbit/s, or a telefax terminal, for example. Six time slots will enable a data transfer rate of 64 kbit/s.

The multi-channel technique in according to the invention, in which a high-speed data signal is transmitted as several lower-speed signals through several parallel traffic channels, has many advantages over an alternative approach in which a mobile station is assigned a single higher-capacity traffic channel having higher maximum data transmission speed than a standard traffic channel. In TDMA systems, for example, a high-speed data signal may be transmitted as several bursts in several time slots within one frame, whereas in an alternative approach in which a mobile station may be assigned several time slots in the same frame for data transmission, but the whole data signal is transmitted as one burst extended for the time of the assigned time slots. In the present invention, there is no need to change the other significant characteristics of the physical transmission path, eg. radio path and traffic channel structure. In TDMA systems, for example, these characteristics may include (at radio interface, for example, Layer 1 of GSM), such as frequency division, frame format and time slot configuration, data transfer rate, error correction, modulation, format of a TDMA burst, bit error ratio (BER), etc. In other words, the present invention allows to support different kind of subscriber data transfer rates in the radio system by a single structure of a physical transmission path. Consequently, there is no need to support several structures of a physical transmission path by the subscriber terminals, either.

By handling each of the parallel traffic channels as an independent traffic channel, a simple implementation is possible as channel coding, interleaving, burst building and modulation operations can separately be carried out to each one of the lower-speed signals. Thus, carrying out different kinds of channel codings and interleavings which depend on the required data transfer rates can be avoided. The simple embodiment is especially advantageous in cases the multi-channel technique according to the invention is applied to existing systems.

In TDMA systems, the implementation may be especially simple if adjacent time slots are employed. Consequently, it will be easier to carry out various measurements the remaining part of the frame, and increasing the number of frequency synthesizers in the receiver of the mobile station is avoided. In the GSM system, it is especially advantageous to implement the invention by two time slots.

BRIEF DESCRIPTION OF THE DRAWINGS

In the following, the invention will be described in greater detail by the preferred embodiments with reference to the accompanying drawings in which.

DETAILED DESCRIPTION OF THE PREFERRED EMBODIMENTS OF THE INVENTION

The present invention can be applied to a high-speed data transmission in digital mobile communication systems utilizing various multiple access methods, such as TDMA or CDMA. In different multiple access methods, the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Examples of mobile communications systems include, for example, the Pan-European digital mobile system GSM, DSC1800 (Digital Communication System), UMTS (Universal Mobile Telecommunication System), FPLMTS (Future Public Land Mobile Telecommunication System), etc.

Figure 1:
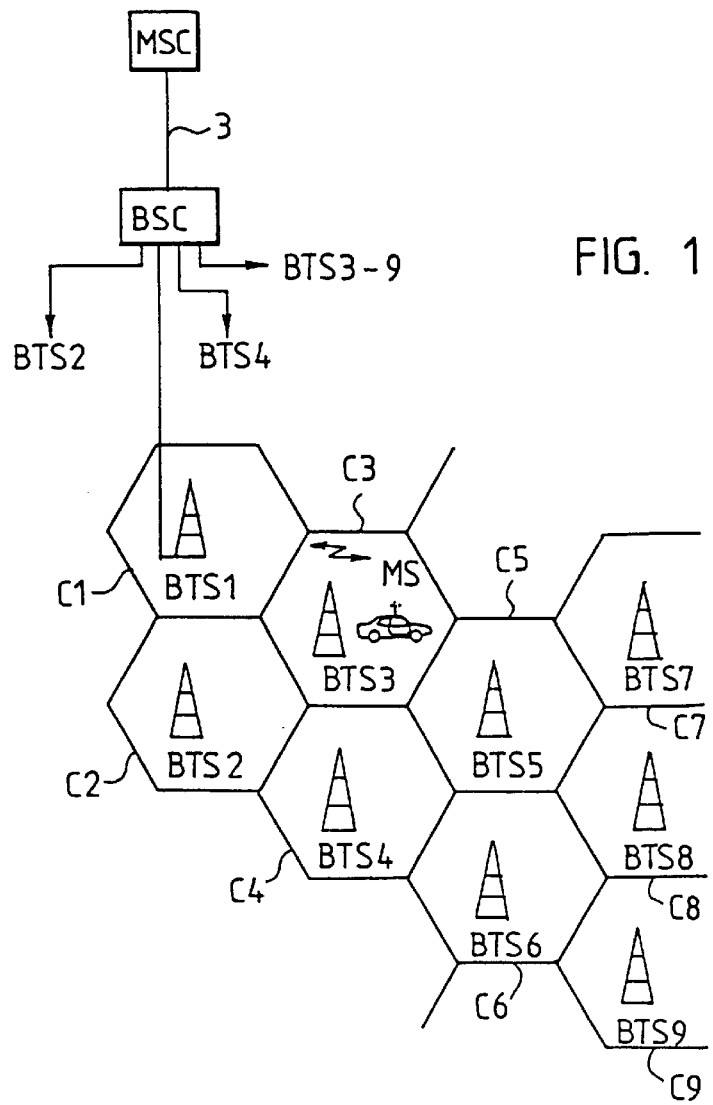
FIG. 1 illustrates a section of a mobile system in which the invention can be applied.

A mobile system of the GSM type is illustrated as an example. GSM (Global System for Mobile Communications) is a Pan-European mobile system. FIG. 1 very briefly illustrates the basic elements of the GSM system without going any further into the details or other subsections of the system. For a closer description of the GSM system, the GSM recommendations and "The GSM System for Mobile Communications", by M. Mouly & M. Pautet, Palaiseau, France, 1992, ISBN: 2-9507190-0-7 is referred to.

A mobile services switching center MSC handles the connecting of incoming and outgoing calls. It performs functions similar to those of an exchange of a public telephone network (PSTN). In addition to these, it also performs functions characteristic of mobile communications only, such as subscriber location management in co-operation with the subscriber registers of the network. As subscriber registers, the GSM system at least includes the home location register HLR and the visitor location register VLR which are not shown in FIG. 1. More accurate information of the location of the subscriber, usually the accuracy of the location area, is stored in the visitor location register, there being typically one VLR per each mobile services switching center MSC, while the HLR knows which VLR area the mobile station MS is visiting. The mobile stations MS are connected to the centre MSC by base station systems. The base station system consists of a base station controller BSC and base stations BTS. One base station controller is used to control several base stations BTS. The tasks of the BSC include, among other things, handovers in cases in which the handover is performed within the base station, or between two base stations controlled by the same BSC. FIG. 1 only shows, for reasons of clarity, a base station system in which nine base stations BTS1–BTS9 are connected to a base station controller BSC, the radio coverage area of which base stations forms the corresponding radio cells C1–C9.

The GSM system is a time division multiple access (TDMA) system in which the time division traffic on the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out.

Figure 2:
FIGS. 2, 3, 4 and 5 illustrate a TDMA frame format.
Figure 3:
Figure 4:
Figure 5:
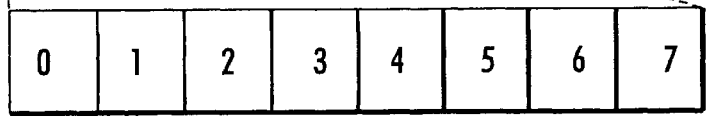

Channel structures used in radio interface of the GSM system are described in closer detail in the ETSI/GSM recommendation 05.02. The TDMA frame format of a the GSM system is illustrated as an example in FIGS. 2–5. FIG. 5 illustrates a TDMA basic frame which includes eight time slots 0–7 used as traffic channels or control channels. Thus, only one radio frequency burst shorter than the duration of the time slot is transmitted in each time slot. As soon as one TDMA basic frame ends in time slot 7, the time slot 0 of the next basic frame immediately begins. Thus, 26 or 51 successive TDMA frames form a multiframe depending on whether a traffic channel or a control channel structure is in question, as illustrated in FIG. 4. A superframe consists of 51 or 26 successive multiframes depending on whether the multiframes have 26 or 51 frames, as illustrated in FIG. 3. A hyperframe is formed of 2048 superframes, as illustrated in FIG. 2. The hyperframe is the largest successive frame unit, whose ending starts a new, similar hyperframe.

Figure 6:
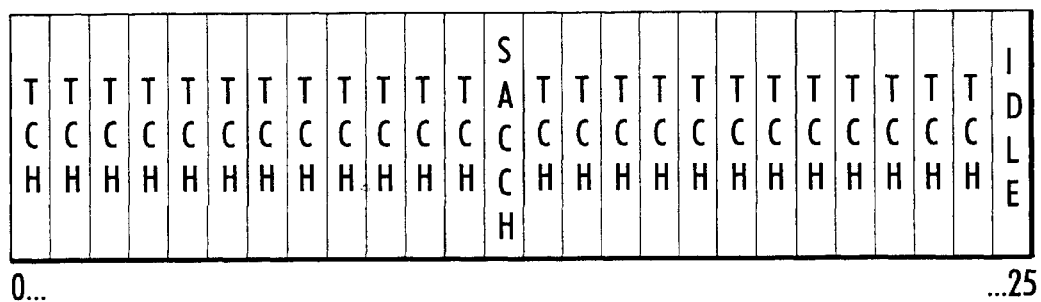
FIG. 6 illustrates a TCH/F+SACCH multiframe.
Figure 7:
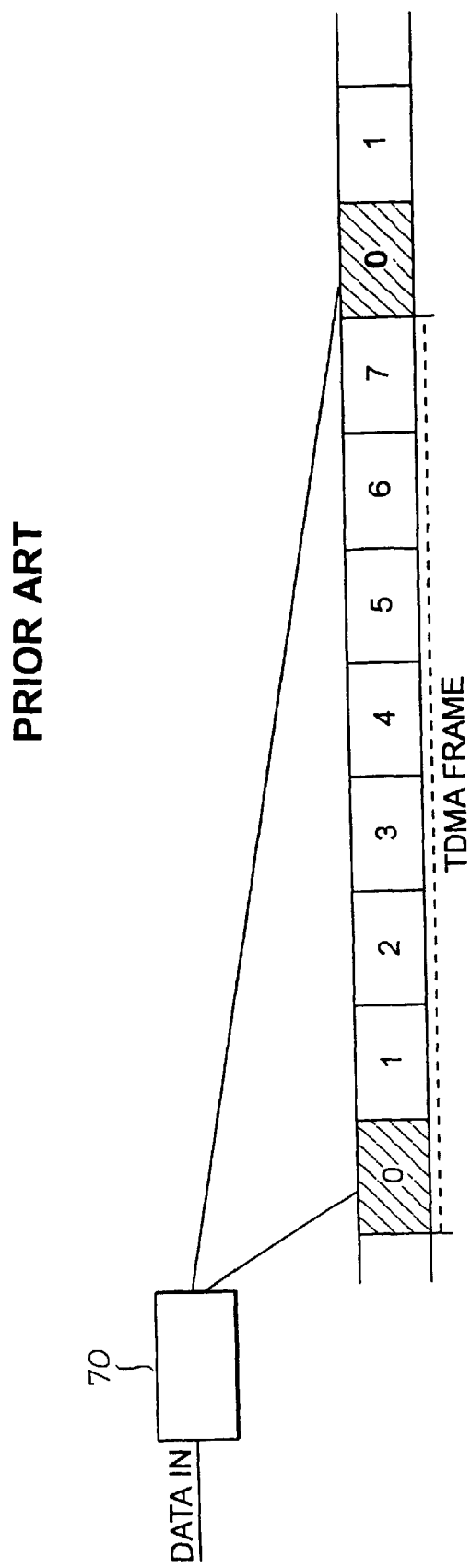
FIG. 7 illustrates a conventional data transmission in one time slot.

FIG. 6 illustrates a structure of a full-speed traffic channel TCH/F-SACCH/TF defined by the recommendation, in which structure a multiframe includes 24 full-speed traffic channel frames TCH, one parallel control channel frame SACCH and a dummy frame IDLE. In each time slot assigned to be used as traffic channels, the control channel SACCH and a dummy time slot are repeated every 26 time slots. The positions of the frames SACCH and IDLE are different for time slots 0, 2, 4 and 6 than for time slots 1, 3, 5, and 7. What is illustrated in FIG. 7 is valid for time slots 0, 2, 4 and 6. In time slots 1, 3, 5 and 7, frames IDLE and SACCH exchange places. The control channel SACCH is used for reporting the measurement results from the mobile station to the fixed radio network, and for controlling of the mobile station, for example, power adjustment, from the fixed radio network.

In normal operation, at the beginning of a call a mobile station MS is assigned one time slot from a carrier wave as a traffic channel (single slot access). The mobile station MS synchronizes into this time slot to transmit and receive radio frequency bursts. In FIG. 7, for example, a mobile station MS is locked to the time slot 0 of a frame. Channel coding, interleaving, burst formation, and modulation 70 are carried out on the data to be transmitted DATAIN, after which operations the radio frequency burst is transmitted in the time slot 0 of each TDMA frame. In the remaining part of the frame, the MS carries out various kinds of measurements, as will be described below.

In accordance with the invention, a mobile station MS requiring data transmission of higher speed than one traffic channel can offer, is assigned two or more time slots from the same frame.

The multi-slot technique according to the invention requires certain additional features in the signalling in connection with traffic channel allocation. During the call set-up time, assigning a traffic channel to a mobile station is carried out by an assignment command which is transmitted to the mobile station by the fixed network. This message must contain the data of all the traffic channels that are assigned to the mobile station MS for high-speed data transmission according to the invention. Already by now, the GSM system must be able to address two half-speed traffic channels in the same assignment command, which is why the message contains descriptions and modes for both the first as well as the second traffic channel. The present assignment command can easily be expanded to cover the addressing of at least two time slots, i.e. full-speed traffic channels. An assignment command is described in the GSM recommendation 04.08, version 4.5.0, June 1993, pp. 168–170. Channel addressing in accordance with the invention can be performed in the assignment command data elements Mode of first channel, mode of second channel, and Channel Description Information element, which are described in greater detail in the GSM recommendation 04.08, version 4.5.0, June 1993, pp. 316–350. For addressing more than two time slots, a new message must be determined. Due to the fact that all the channels addressed are of the same type of channel, TCH/F, the message can be limited to describe the type of the first channel and then the total number of channels required. In such a case, the message would be rather short and simple.

Correspondingly, in case of a handover, the handover command must be able to address two or more time slots in the same frame. In the GSM system, the handover command contains the same data fields as described above in connection with the assignment command, and thus it can be applied to the requirements of the invention with similar changes. The handover command is described in the GSM recommendation 04.08, version 4.5.0, June 1993, pp. 184–189.

A second alternative is to employ a dedicated assignment command for each time slot.

In both cases, both outgoing and incoming call set-up messages (SETUP) of a mobile station must contain information about the actual channel requirements, in other words, the number of time slots needed. This information may be included in the Bearer Capability Information element BCIE. The BCIE is described in the GSM recommendation 04.08, version 4.5.0, pp. 423–431.

Figure 8:
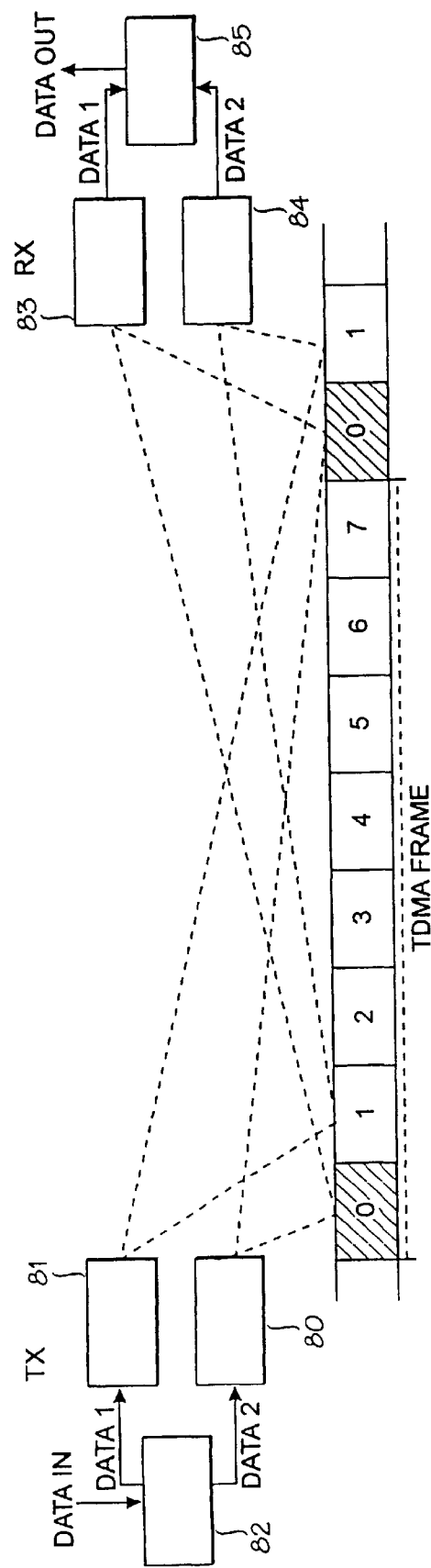
FIG. 8 illustrates data transmission in accordance with the invention in two time slots.

FIG. 8 shows an example in which a mobile station MS is assigned successive time slots 0 and 1 from the same TDMA frame. A high-speed data signal DATAIN to be transferred over the radio path is split in the divider 82 into a necessary number of data signals of lower speed DATA1 and DATA2. Channel coding, interleaving, burst formation and modulation 80, and, correspondingly, 81, are separately carried out for each data signal of lower speed DATA1 and DATA2, after which each data signal is transmitted as a radio frequency burst in its dedicated time slots 0 and 1, respectively. As soon as the lower speed data signals DATA1 and DATA2 are separately transmitted over the radio path, demodulation, deinterleaving and channel decoding 83 and, correspondingly, 84, of the signals are separately performed at the receiving end, after which the signals DATA1 and DATA2 are combined into the original high-speed signal DATAOUT in the combiner 85 at the receiving end.

On the fixed network side, the functions of blocks 80, 81, 83, 84 of FIG. 8, in other words, channel coding, interleaving, burst formation and modulation, and, correspondingly, demodulation, deinterleaving and channel decoding are located advantageously at the base station BTS. The base station BTS has a separate, parallel handling for each time slot. The divider 82 and the combiner 85 can, in turn, be assigned, as needed, to any network element such as a base station BTS, a base station controller BSC, or a mobile services switching centre MSC. In cases the divider 82 and the combiner 85 are located in another network element than the base station BTS, the data signals of lower speed DATA1 and DATA2 are transmitted between that element and the base station BTS similarly to signals on normal traffic channels.

In a fixed network of the GSM system, various functions relating to speech coding and rate adaptation are concentrated in a TRCU (Transcoder/Rate Adaptor Unit). The TRCU may be located in several alternative places in the system according to choices made by the manufacturer. Typically, the TRCU is placed at the mobile services switching center MSC, but it may also be a part of a base station controller BSC or a base station BTS. In cases the TRCU is placed apart from a base station BTS, information is transmitted between the base station and the transcoder/rate adaptor unit TRCU in so-called TRAU frames. The function of the transcoder/rate adaptor unit is defined in the GSM recommendation 08.60. A combiner 85 and a divider 83 in accordance with the invention may be placed with this transcoder/rate adaptor unit TRCU.

In a mobile station MS, the blocks 80, 81, 83 and 84 of FIG. 8, in other words, channel coding, interleaving, burst formation and modulation, and, correspondingly, demodulation, deinterleaving and channel decoding, are advantageously implemented by a processing unit common to all time slots, at least in an embodiment of two time slots.

The use of two adjacent time slots in the same frame results in the simplest implementation of a mobile station MS due to, above all, the number of frequency synthesizers needed. This can be illustrated by FIGS. 9 and 10.

Figure 9:
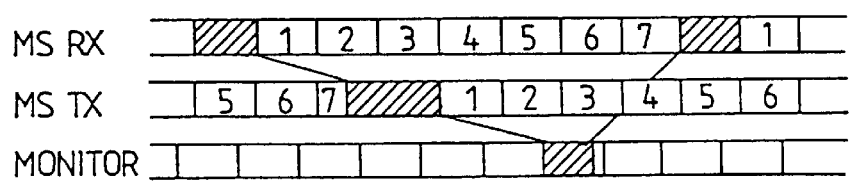
FIG. 9 illustrates the timing of transmission, reception and measurements in a data transmission of one time slot.

In FIG. 9, a mobile station is in a normal manner locked in the time slot 0 of a frame, and carries measurements during the other time slots. Between the downlink direction (BTS to MS) and the uplink direction (MS to BTS) there is an offset of three time slots in the time slot numbering so that the reception is not interfered with by own transmission. Transmitting time (TX) of approximately 1.5 time slots is shown. This is due to the fact that the actual transmission can take place within this range depending on the timing advance used for compensating the transmission delay caused by the distance between the base station and the mobile station. There are at least 1.5 time slots between transmission and reception (RX) in order to leave an adequate settling time for the MS frequency synthesizer which generates local oscillator signals for transmission and reception. This means that only one frequency synthesizer is required for transmission and reception.

Figure 10:
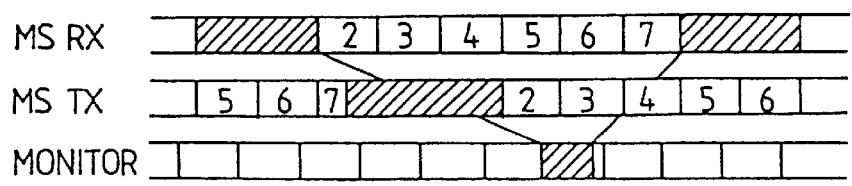
FIG. 10 illustrates the timing of transmission, reception and measurements in a data transmission of two time slots.

FIG. 10 shows a case in which a mobile station MS is assigned two adjacent time slots in each frame for high-speed data transmission according to the present invention. A second time slot 1 immediately follows the first time slot in both RX and TX directions. By placing two time slots in succession like this, it is ensured that RX and TX operations do not overlap by which distinct advantages can be achieved. A frequency synthesizer would not, however, have enough time to settle between all the TX and RX operations, which means that separate frequency synthesizers are required, one for receiving and one for transmitting, unless very fast frequency synthesizers are employed.

In cases the number of time slots increases to more than two, RX and TX operations do overlap and full duplex filtering is required. As a result, the measurement moment can be set more freely, which is why two frequency synthesizers is still adequate for three or four time slots, possibly even five, as the same synthesizer can be used for both reception and measuring operations. An implementation of six time slots already requires separate frequency synthesizers for reception as well as measuring operations, unless very fast frequency synthesizers are employed.

As noted above the present invention is universally applicable on various kinds of multiple access methods and traffic channels. In CDMA systems the traffic channels are defined by pseudorandom noise (PN) codes, i.e. spreading codes, assigned to each user or connection. From the present invention point of view the CDMA traffic channel is similar to the TDMA traffic channel. The basic contribution of the present invention is to allocate parallel traffic channels to a single user so as to provide a high-speed data connection.

Figure 11:
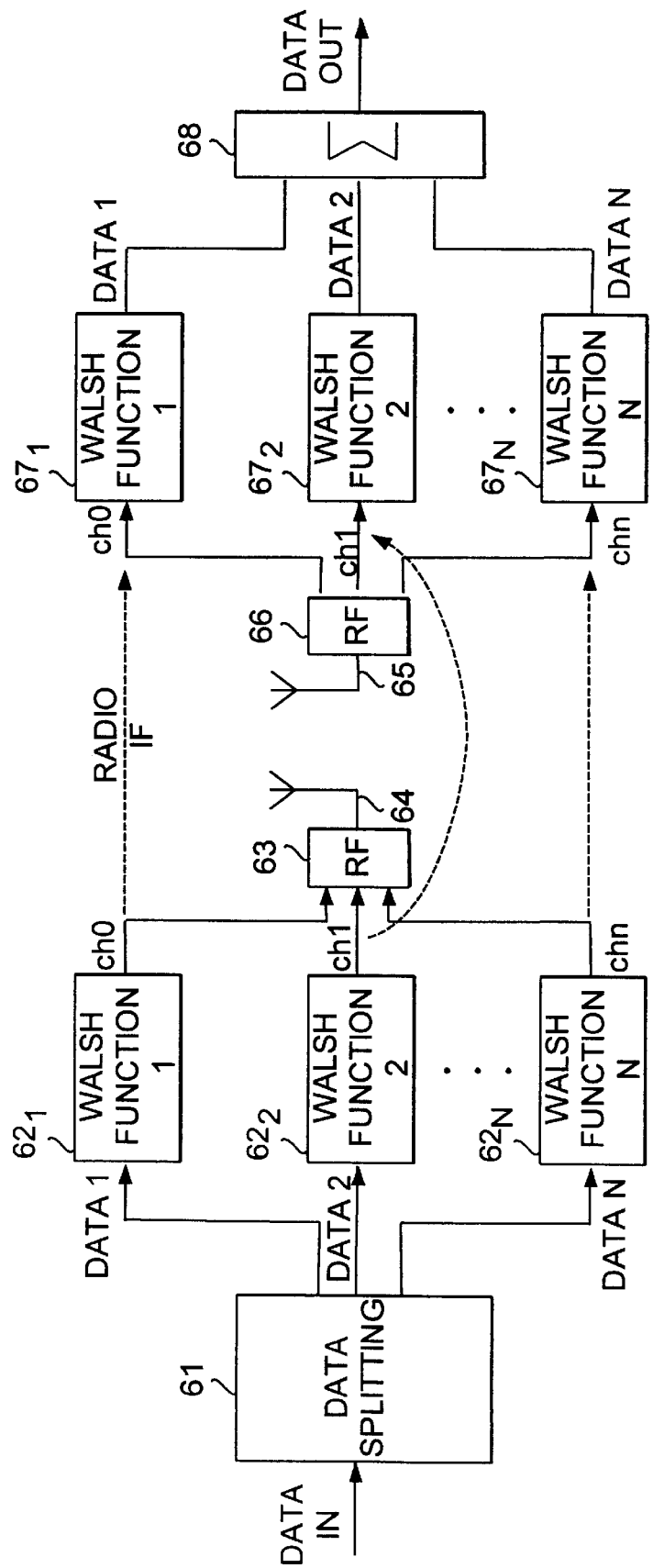
FIGS. 11, 12A and 12B illustrate a high-speed data transmission according to the present invention over N parallel CDMA traffic channels.

Such a high-speed data transmission according to the present invention over N parallel CDMA traffic channels is illustrated in FIG. 11. A high-speed data signal DATAIN that is to be transmitted over the radio path is divided in a data splitter 61 into the required number of slower-speed data signals DATA1 . . . DATAN. A respective number N of parallel CDMA traffic channels ch0 . . . chn is allocated for the transmission. In other words, an unique spreading code is allocated for each slower-speed signal DATA1 . . . DATAN in order to distiquish them from each other during simultaneous transmission over the radio interface. The spreading codes of the system are preferably selected in such a way that the codes used in each system cell are mutually orthogonal, i.e. they do not correlate with each other. One class of suitable orthogonal binary sequences is called the Walsh function. In the embodiment shown in FIG. 11, the traffic channel separation is done by coding (multiplying) each lower-speed data stream DATA1 . . . DATAN by modified Walsh functions 1 . . . N of length 255 in respective Walsh encoders $62_1$ . . . $62_N$, in order to spread the data streams in bandwidth. The Walsh function is modified so tat last bit of all of the functions have been deleted. The spread-spectrum data streams are fed to through radio frequency (RF) parts 63 to an antenna 64 for transmission over the radio interface.

The RF signal received at receiving antenna 65 is fed through radio frequency (RF) parts 66 and splitted in parallel to correlator branches $67_1$ . . . $67_N$. Correlators $67_1$ . . . $67_N$ are Walsh decoders each of which decodes (multiplies) the received spread-spectrum signal by the Walsh function 1 . . . N of the respective CDMA traffic channel ch0 . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

A data transmission according to the present invention through the parallel CDMA traffic channels can thus be according to similar principles as described above for TDMA traffic channels. The only difference is that spreading codes (e.g., Walsh functions) will be used instead of time slots as traffic channels.

Typically, there are various coding and signal processing operations, such as channel coding (convolutional coding), symbol repetition, interleaving, etc., involved with the data transmission. These additional operations are not essential in the point of view of present invention. In the embodiment of FIG. 11, it is assumed that these coding and interleaving operations, if any, are done to the high-speed data streams DATAIN and DATAOUT prior to the data splitting 61 and subsequent to data combining 68.

Figure 12A:
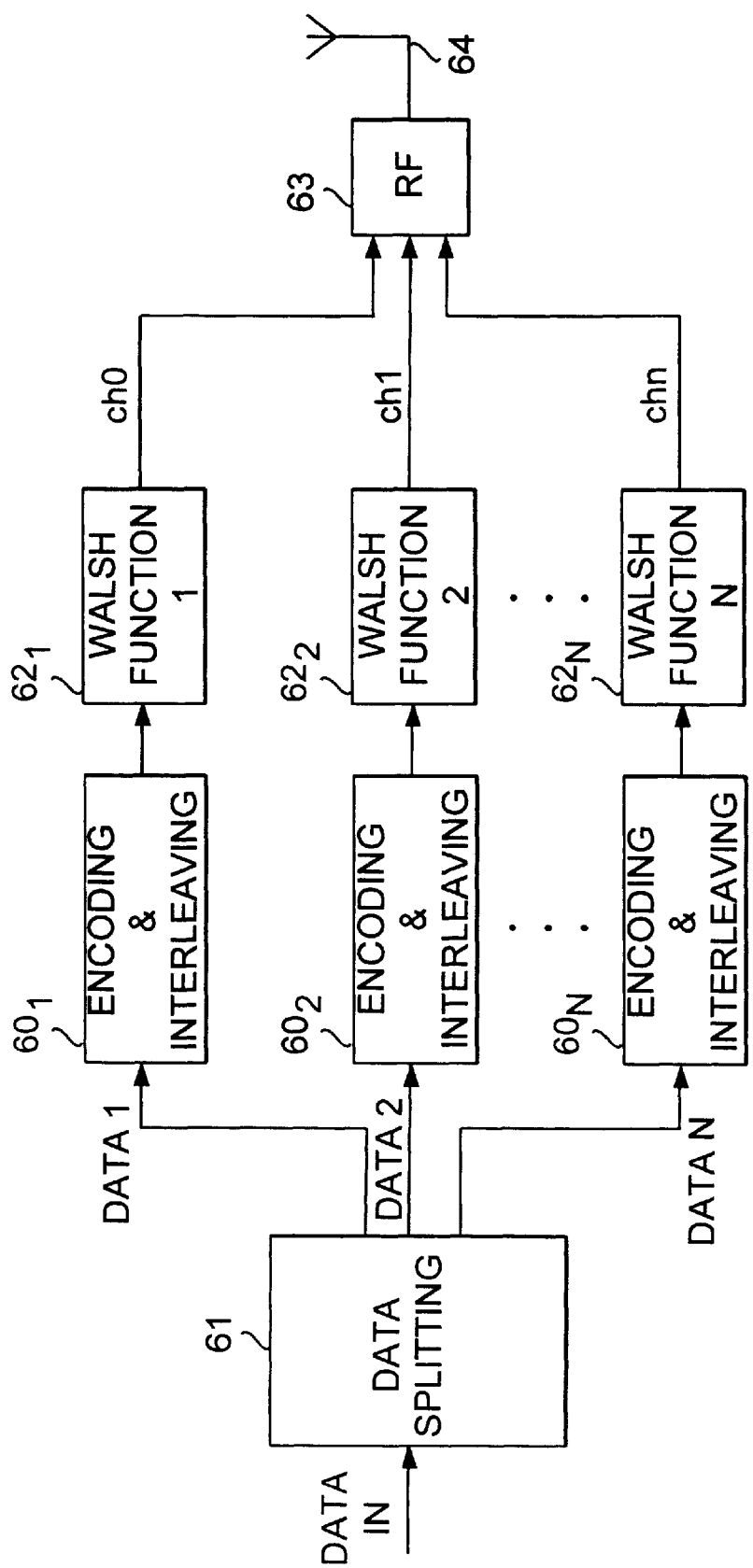
Figure 12B:
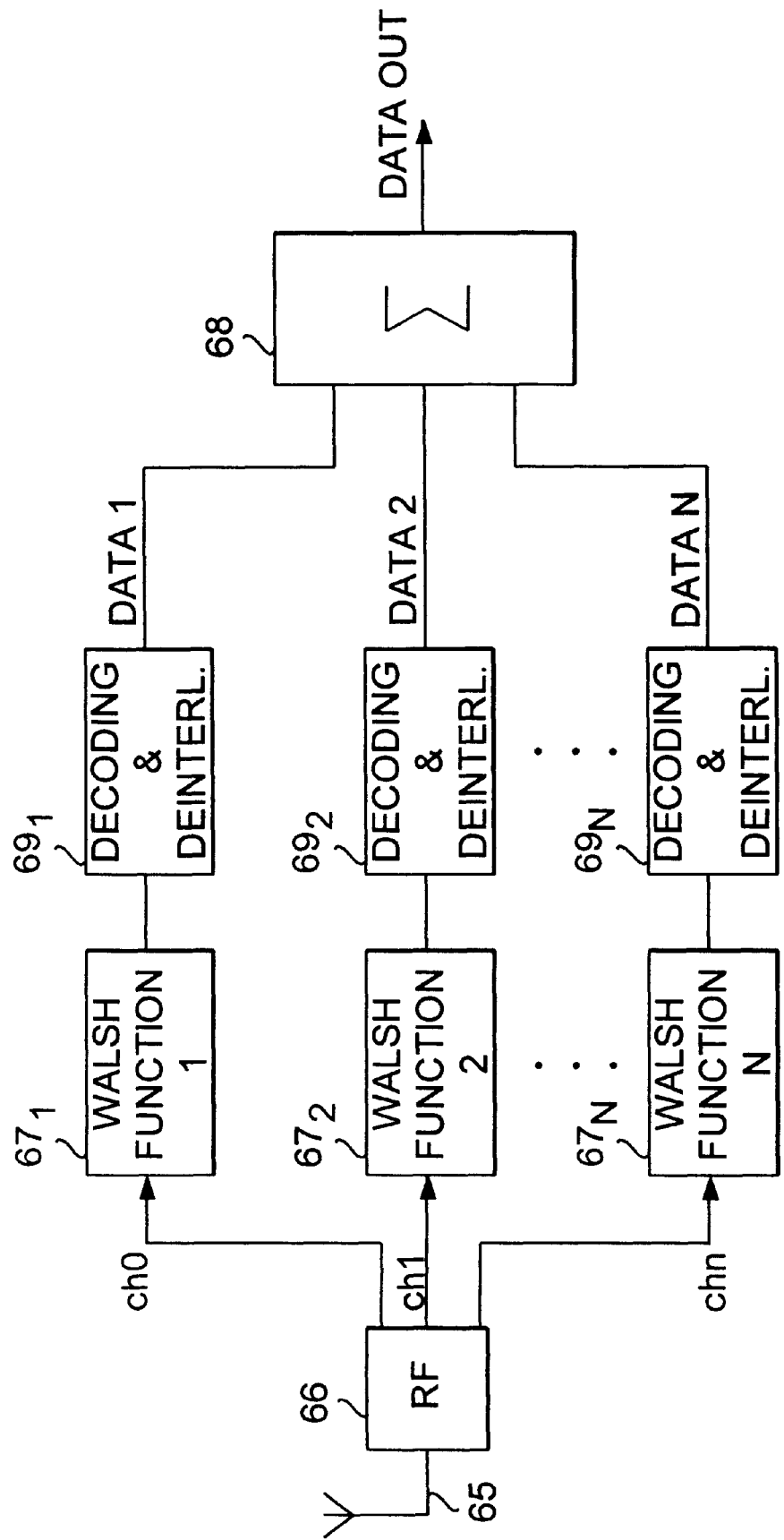

In another embodiment, illustrated in FIGS. 12A and 12B, the channel coding, interleaving and other additional operations are done separately on each slow-speed data stream DATA1 . . . DATAN. To this end, encoding and interleaving blocks $60_1$ . . . $60_N$ are provided between the data splitter 61 and the Walsh encoders $62_1$ . . . $62_N$ in the transmitter of FIG. 12A. Similarly, decoding and deinterleaving blocks $69_1$ . . . $69_N$ are provided between the Walsh decoders $67_1$ . . . $67_N$ and the data combiner 68 in the receiver of FIG. 12B.

Figure 13:
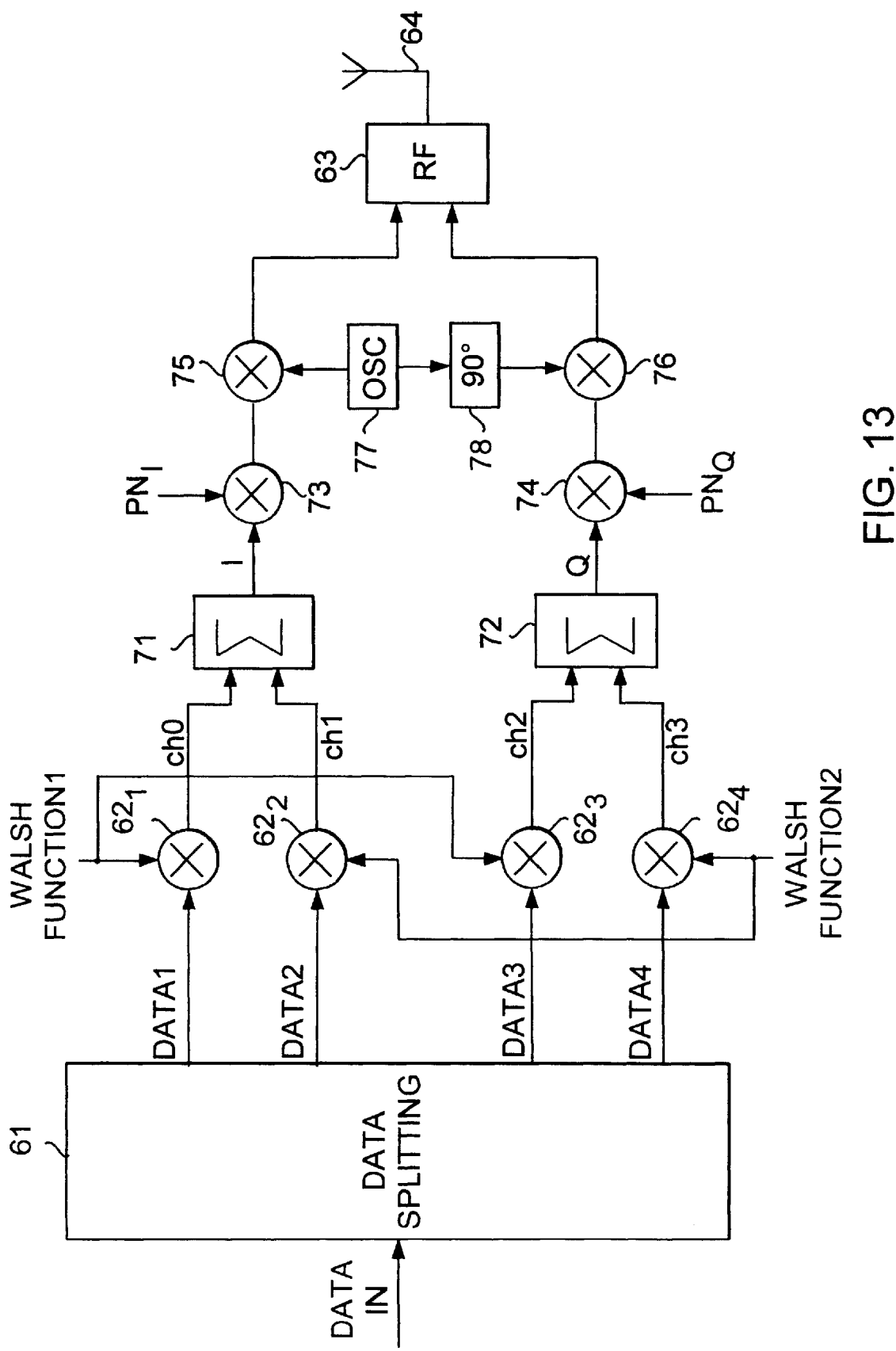
FIG. 13 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 13 shows an example of how four channels can be divided between quadrature (Q) and in-phase (I) branches in a QPSK modulator. High-speed data signal DATAIN is split into slow-speed data streams DATA1 . . . DATA4 and fed to multipliers $62_1$ . . . $62_4$ (Walsh encoders), respectively. In multipliers $62_1$ and $62_3$, data streams DATA1 and DATA3 are multiplied by Walsh function 1. Similarly, in multipliers $62_2$ and $62_4$, data streams DATA2 and DATA4 are multiplied by Walsh function 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

The figures and the explanation in connection with them are only meant to illustrate the present invention. The method and arrangement in accordance with the invention may vary within the scope of the attached claims.

We claim:

1. A method for high-speed data transmission over an air interface between a mobile station and a fixed mobile communication network in a digital mobile communication station, comprising the steps of:

splitting a high-speed data signal into two or more signals of lower speed prior to transmission over a radio path from a transmitting end to a receiving end;

allocating, for high-speed data transmission, the mobile station at least two traffic channels, the number of said allocated traffic channels corresponding to the number of said signals of lower speed;

transmitting each data signal of lower speed in different one of said allocated traffic channels;

carrying out channel coding, interleaving and modulation operations separately for each one of said lower-speed signals at said transmitting end; and carrying out demodulation, deinterleaving and channel decoding operations separately for each one of said lower-speed signals at said receiving end.

2. The method as claimed in claim 1, comprising practicing said step of splitting said high-speed data signal into said lower-speed signals at a base station; and said receiving end is at said mobile station.

3. The method as claimed in claim 1, further comprising steps of:

practicing said splitting of said high-speed data signal into said lower-speed signals somewhere else than at a base station; and said transmitting includes transmitting said high-speed data signal to the base station as said lower-speed signals, for transmission by the base station to the mobile station.

4. The method according to claim 1, wherein:

said digital mobile communication system is a code division multiple access (CDMA) system, and said traffic channels are CDMA traffic channels.

5. The method according to claim 4, wherein:

said CDMA traffic channels are distinguished from each other by using different spreading codes.

6. The method according to claim 4, wherein:

said traffic channels are distinguished from each other by using different Walsh functions.

7. An arrangement for high-speed data transmission in a mobile telecommunications system over a radio path having a plurality of traffic channels between a mobile station and a base station, comprising:

means for splitting a high-speed data signal, whose speed is higher than the maximum data transfer rate of one said traffic channel, into two or more signals of lower speed prior to transmission over the radio path;

two or more of said traffic channels being allocated to said mobile station for high-speed data transmission, so that said arrangement is arranged to transmit each of said lower-speed signals over the radio path in a respective said traffic channel;

means for performing channel coding, interleaving and modulation operations separately for each one of said lower-speed signals at a respective transmitting end;

means for performing demodulation, deinterleaving and channel decoding operations separately for each one of said lower-speed signals at a respective receiving end; and means for combining said lower-speed signals as received over the radio path into said high-speed data signal.

8. The arrangement as claimed in claim 7, wherein: said means for combining and splitting are placed at said base station and said mobile station.

9. The arrangement as claimed in claim 7, wherein:

said system further comprises a mobile exchange; and said means for combining and said means for splitting are placed at said mobile exchange and at said mobile station.

10. The arrangement as claimed in claim 7, wherein:

said base station comprises means for performing channel coding, interleaving and modulation operations separately for each one of said lower-speed signals.

11. The arrangement as claimed in claim 7, wherein:

said mobile station comprises means common to all said lower-speed signals for performing channel coding, interleaving and modulation operations.

12. The system according to claim 7, wherein:

said mobile communication system is a code division multiple access (CDMA) system, and said traffic channels are CDMA traffic channels.

13. The system according to claim 12, wherein:
said CDMA traffic channels are distinguished from each other by being arranged to use different spreading codes.

14. The system according to claim 12, wherein:
said traffic channels are distinguished from each other by being arranged to use different Walsh functions.

15. A mobile station for a digital mobile communication system having the capability of allocating to the mobile station two or more parallel traffic channels having mutually different channel numbers during the connection for transmission of a high-speed data signal over a radio path between said mobile station and said mobile communication system, when the transmission rate required by said high-speed data signal is higher than a maximum transmission rate of one said traffic channel, said mobile station:
having splitting means arranged to split a high-speed data signal, having a speed which is higher than the maximum data transfer rate of one said traffic channel, into two or more signals of lower speed prior to transmission over said radio path;
having channel coding means arranged to perform channel coding, interleaving and modulation operations separately for each one of said lower-speed signals to be transmitted;
having transmitting means arranged to transmit each of said lower-speed signals over said radio path in respective ones of said allocated traffic channels;
having demodulation, deinterleaving and channel decoding means arranged to perform demodulation, deinterleaving and channel decoding operations separately for each one of said lower-speed signals received; and
combining means arranged to combine lower-speed signals received over said radio path through said allocated traffic channels, into a high-speed data signal.

16. The mobile station according to claim 15, wherein:
said digital mobile communication system is a code division multiple access (CDMA) system, and said traffic channels are CDMA traffic channels.

17. The mobile station according to claim 16, wherein:
said CDMA traffic channels are distinguished from each other by being arranged to use different spreading codes.

18. The mobile station according to claim 16, wherein:
said traffic channels are distinguished from each other by being arranged to use different Walsh functions.

19. A method for high-speed data transmission over an air interface between a mobile station and a fixed mobile communication network in a digital mobile communication system, said method comprising the steps of:
splitting a high-speed data signal into two or more signals of lower speed in the mobile communication network at a location remote from a serving base station;
transmitting said lower-speed signals to the serving base station;
allocating, for high-speed data transmission, to the mobile station at least two traffic channels, the number of said allocated traffic channels corresponding to the number of said signals of lower speed; and
transmitting each said data signal of lower speed in respective different ones of said allocated traffic channels over a radio path from said serving base station to said mobile station.

20. An arrangement for high-speed data transmission in mobile telecommunications system over a radio path between a mobile station and a base station, said arrangement comprising:
means for splitting a high-speed data signal having a speed which is higher than the maximum data transfer rate of one traffic channel of said radio path, into two or more signals of lower speed in a mobile communication network, at a location remote from said base station:
means for transmitting said lower-speed signals to said base station:
said mobile station being allocated two or more traffic channels of said radio path, for lower-speed data transmission, so that each of said lower-speed signals is arranged to be transmitted over the radio path in a respective said traffic channel; and
means for transmitting each data signal of lower speed in different one of said allocated traffic channels over the radio path from said serving base station to said mobile station.

21. A method for high-speed data transmission over an air interface between a mobile station and a fixed mobile communication network in a digital mobile communication system, said method comprising the steps of:
splitting a high-speed data signal into two or more signals of lower speed in the mobile communication network at a location remote from a serving base station;
transmitting said lower-speed signals to the serving base station;
allocating, for high-speed data transmission, to the mobile station at least two traffic channels, the number of said allocated traffic channels corresponding to the number of said signals of lower speed;
carrying out channel coding, interleaving and modulating operations separately for each one of said lower-speed signals at the serving base station;
transmitting each said data signal of lower speed in respective different ones of said allocated traffic channels over a radio path from said serving base station to said mobile station; and
carrying out demodulation, deinterleaving and channel decoding operations separately for each one of said lower-speed signals at the mobile station.

22. An arrangement for high-speed data transmission in a mobile telecommunications system over a radio path between a mobile station and a base station, said arrangement comprising:
means for splitting a high-speed data signal having a speed which is higher than the maximum data transfer rate of one traffic channel of said radio path, into two or more signals of lower speed in a mobile communication network, at a location remote from said base station;
means for transmitting said lower-speed signals to said base station;
said mobile station being allocated two or more traffic channels of said radio path, for lower-speed transmission, so that each of said lower-speed signals is arranged to be transmitted over the radio path in a respective said traffic channel;
means for performing channel coding, interleaving and modulation operations separately for each one of said lower-speed signals at the serving base station;
means for transmitting each data signal of lower speed in different one of said allocated traffic channels over the radio path from said serving base station to said mobile station; and means for performing demodulation, deinterleaving and channel decoding operations separately for each one of said lower-speed signals at the mobile station.

23. A method for high-speed data transmission over an air interface between a mobile station and a fixed mobile communication network in a digital mobile communication system, said method comprising:

splitting a high-speed data signal into two or more signals of lower speed in the mobile communication network at a location remote from a serving base station wherein the remote location is located at at least one of a base station controller and a mobile services switching center;

transmitting said lower-speed signals to the serving base station;

allocating, for high-speed data transmission, to the mobile station at least two traffic channels, the number of said allocated traffic channels corresponding to the number of said signals of lower speed; and transmitting each said data signal of lower speed in respective different ones of said allocated traffic channels over a radio path from said serving base station to said mobile station.

24. An arrangement for high-speed data transmission in mobile telecommunications system over a radio path between a mobile station and a base station, said arrangement comprising:

means for splitting a high-speed data signal having a speed which is higher than the maximum data transfer rate of one traffic channel of said radio path, into two or more signals of lower speed in a mobile communication network, at a location remote from said base station, wherein the location is located at at least one of a base station controller and a mobile services switching center;

means for transmitting said lower-speed signals to said base station:

said mobile station being allocated two or more traffic channels of said radio path, for lower-speed data transmission, so that each of said lower-speed signals is arranged to be transmitted over the radio path in a respective said traffic channel; and means for transmitting each data signal of lower speed in different one of said allocated traffic channels over the radio path from said serving base station to said mobile station.

* * * * *